(12) United States Patent
Tomimoto et al.

(10) Patent No.: US 9,947,477 B2
(45) Date of Patent: Apr. 17, 2018

(54) METHOD OF MANUFACTURING THIN-FILM POLYMER MULTI-LAYER CAPACITOR AND THIN-FILM POLYMER MULTI-LAYER CAPACITOR

(71) Applicant: RUBYCON CORPORATION, Nagano (JP)

(72) Inventors: Shigeya Tomimoto, Nagano (JP); Tomonao Kako, Nagano (JP)

(73) Assignee: RUBYCON CORPORATION, Nagano (JP)

( * ) Notice: Subject to any disclaimer, the term of this patent is extended or adjusted under 35 U.S.C. 154(b) by 95 days.

(21) Appl. No.: 15/117,707

(22) PCT Filed: Feb. 10, 2014

(86) PCT No.: PCT/JP2014/053103
§ 371 (c)(1),
(2) Date: Aug. 9, 2016

(87) PCT Pub. No.: WO2015/118693
PCT Pub. Date: Aug. 13, 2015

(65) Prior Publication Data
US 2017/0025224 A1    Jan. 26, 2017

(51) Int. Cl.
*H01G 4/30*     (2006.01)
*H01G 4/14*     (2006.01)
(Continued)

(52) U.S. Cl.
CPC .......... *H01G 4/306* (2013.01); *C09D 135/02* (2013.01); *H01G 4/145* (2013.01); *H01G 4/18* (2013.01); *H01G 13/00* (2013.01)

(58) Field of Classification Search
CPC .......... H01G 4/306; H01G 4/145; H01G 4/18; H01G 13/00; C09D 135/02
(Continued)

(56) References Cited

U.S. PATENT DOCUMENTS 5,032,461 A * 7/1991 Shaw .................. B05D 1/60
                                                        118/50.1
2009/0308532 A1   12/2009 Kinoshita et al.

FOREIGN PATENT DOCUMENTS

JP            6-29147 A     2/1994
JP        2000-195751 A     7/2000
(Continued)

OTHER PUBLICATIONS

International Search Report in International Application No. PCT/JP2014/053103, dated May 27, 2014.
(Continued)

*Primary Examiner* — Jenny L Wagner
*Assistant Examiner* — Michael P McFadden
(74) *Attorney, Agent, or Firm* — Hauptman Ham, LLP (57) ABSTRACT

In a method of manufacturing a thin-film polymer multi-layer capacitor, in a vacuum chamber, a resin thin film layer forming step of forming a resin thin film layer by forming a monomer layer by vapor-depositing a monomer and thereafter by curing the monomer layer by irradiating an electron beam onto the monomer layer, and a metal thin film layer forming step of forming a metal thin film layer by vapor-depositing a metal material are alternately performed on a rotary drum thus forming a multi-layer body in which the resin thin film layer and the metal thin film layer are alternately laminated on the rotary drum. In the resin thin film layer forming step, the monomer layer is formed using a dimethacrylate compound having an alicyclic hydrocarbon skeleton expressed by a following chemical formula (1) as the monomer.

(Continued)

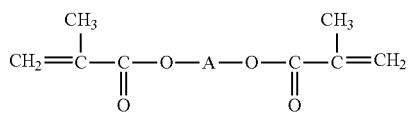

(1)

wherein, symbol A indicates an organic group containing alicyclic hydrocarbon.

9 Claims, 1 Drawing Sheet

(51) Int. Cl.
*H01G 4/18* (2006.01)
*H01G 13/00* (2013.01)
*C09D 135/02* (2006.01)

(58) Field of Classification Search
USPC .......................................................... 361/323
See application file for complete search history.

(56) References Cited

FOREIGN PATENT DOCUMENTS

| JP | 2002-198257 A | 7/2002 |
| JP | 2004-6495 A | 1/2004 |
| JP | 2007-180199 A | 7/2007 |
| JP | 2011-146553 A | 7/2011 |

OTHER PUBLICATIONS

Extended European Search Report in EP Application No. 14881786.9, dated Jul. 17, 2017, 8pp.

* cited by examiner

METHOD OF MANUFACTURING THIN-FILM POLYMER MULTI-LAYER CAPACITOR AND THIN-FILM POLYMER MULTI-LAYER CAPACITOR

RELATED APPLICATIONS

The present application is a National Phase of International Application Number PCT/JP2014/053103, filed Feb. 10, 2014.

TECHNICAL FIELD

The present invention relates to a method of manufacturing a thin-film polymer multi-layer capacitor and a thin-film polymer multi-layer capacitor.

BACKGROUND ART

Figure 2:
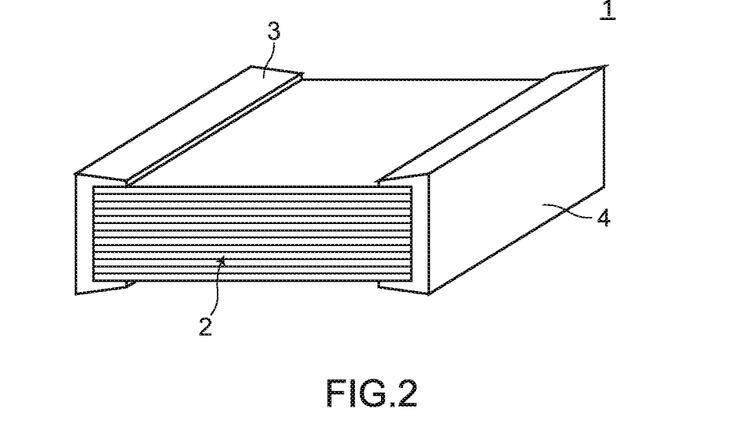
FIG. 2 is a perspective view of a thin-film polymer multi-layer capacitor 1.

FIG. 2 is a perspective view of a thin-film polymer multi-layer capacitor 1. In FIG. 2, symbol 2 indicates a multi-layer body formed by alternately laminating a resin thin film layer made of thin film polymer and a metal thin film layer made of a metal vapor-deposited film to each other. Symbols 3, 4 indicate external electrodes.

The thin-film polymer multi-layer capacitor 1 is a thin-film polymer multi-layer capacitor having the multi-layer body 2 formed by alternately laminating: the resin thin film layer which is formed by preparing a monomer layer by vapor-depositing a monomer and, thereafter, curing the monomer layer by irradiating electron beams onto the monomer layer; and the metal thin film layer formed by vapor-depositing a metal material (see FIG. 2).

The technical feature of the thin-film polymer multi-layer capacitor 1 lies in that the thin-film polymer multi-layer capacitor 1 can be more easily miniaturized than a usual film capacitor which is manufactured by winding an elongated film where a metal thin layer is formed on a resin film in a cylindrical shape. Further, the thin-film polymer multi-layer capacitor 1 is more light-weighted than a laminated ceramic capacitor, and has no piezoelectric characteristic unlike the laminated ceramic capacitor. Still further, the thin-film polymer multi-layer capacitor 1 has a characteristic where a risk of smoke and fire in an open defect mode is low so that a temperature characteristic is stable. Due to such technical features, the thin-film polymer multi-layer capacitor 1 has been recently popularly used in various fields.

A thin-film polymer multi-layer capacitor 1 can be manufactured by a method of manufacturing a thin-film polymer multi-layer capacitor which includes a multi-layer body manufacturing step where, in a vacuum chamber, a resin thin film layer forming step of forming a resin thin film layer by forming a monomer layer by vapor-depositing a monomer and thereafter by curing the monomer layer by irradiating an electron beam onto the monomer layer, and a metal thin film layer forming step of forming a metal thin film layer by vapor-depositing a metal material are alternately performed on a rotary drum thus forming a multi-layer body in which a resin thin film layer and a metal thin film layer are alternately laminated on the rotary drum (see patent literatures 1, 2).

In patent literatures 1, 2, as a monomer, the use of various acrylate compounds such as dicyclopentadiene methanol diacrylate and tricyclodecane dimethanol diacrylate are disclosed. Further, as a monomer, the use of a methacrylate compound is also disclosed.

However, among these monomers, a methacrylate compound exhibits less curing property and hence, it is difficult to use a methacrylate compound as a dielectric material of a thin-film polymer multi-layer capacitor. Accordingly, at present, in general, an acrylate compound is used as a dielectric material of the thin-film polymer multi-layer capacitor.

CITATION LIST

Patent Literature

Patent Literature 1: JP-A-2002-198257
Patent Literature 2: JP-A-6-29147

SUMMARY OF INVENTION

Technical Problem

In the technical field of a capacitor, conventionally, there has been always a demand for a capacitor which exhibits a long lifetime in a high temperature and high humidity environment and a method of manufacturing a capacitor capable of manufacturing such a capacitor. The technical field of a thin-film polymer multi-layer capacitor is not an exception to this demand. However, when an acrylate compound is used as a dielectric material of a thin-film polymer multi-layer capacitor, hygroscopic property of a resin thin film layer is high and hence, it is difficult to realize a thin-film polymer multi-layer capacitor which exhibits a long lifetime in a high temperature and high humidity atmosphere.

In view of the above, the case may be considered where, as a monomer, in place of an acrylate compound, a methacrylate compound capable of manufacturing a polymer having low hygroscopic property compared to an acrylate compound is used. This is because a lifetime of a capacitor in a high temperature and high humidity environment may be extended with the use of a polymer having low hygroscopic property as a resin thin film layer of a thin-film polymer multi-layer capacitor.

The inventors of the present invention have carried out various experiments on the use of a methacrylate compound as a monomer. However, as a result of the various experiments, the inventors have found that when a general methacrylate compound is used as a monomer, because of low curing property of the methacrylate compound, a resin thin film layer having a suitable degree of curing cannot be obtained, and it is difficult to manufacture a thin-film polymer multi-layer capacitor having desired performance.

The present invention has been made in view of such circumstances, and it is an object of the present invention to provide a thin-film polymer multi-layer capacitor which exhibits a longer lifetime in a high temperature and high humidity atmosphere than the prior art and possesses desired performances, and a method of manufacturing a thin-film polymer multi-layer capacitor capable of manufacturing such a thin-film polymer multi-layer capacitor.

Solution to Problem

The inventors of the present invention have carried out the further experiments, and have found that, with the use of a dimethacrylate compound having an alicyclic hydrocarbon skeleton expressed by a following chemical formula (1) as a monomer in place of a methacrylate compound used in general, it is possible to sufficiently increase a degree of curing of an obtained resin thin film layer and, as a result, it is possible to manufacture a thin-film polymer multi-layer capacitor which has a long lifetime in a high temperature and high humidity atmosphere compared to the prior art and exhibits desired performances, and the inventors have completed the present invention (a method of manufacturing a thin-film polymer multi-layer capacitor and a thin-film polymer multi-layer capacitor) based on such finding.

(1)

wherein, symbol A indicates an organic group containing alicyclic hydrocarbon.

[1] A method of manufacturing a thin-film polymer multi-layer capacitor according to the present invention is directed to a method of manufacturing a thin-film polymer multi-layer capacitor which includes a multi-layer body manufacturing step where, in a vacuum chamber, a resin thin film layer forming step of forming a resin thin film layer by forming a monomer layer by vapor-depositing a monomer and thereafter by curing the monomer layer by irradiating an electron beam onto the monomer layer, and a metal thin film layer forming step of forming a metal thin film layer by vapor-depositing a metal material are alternately performed on a rotary drum thus forming a multi-layer body in which the resin thin film layer and the metal thin film layer are alternately laminated on the rotary drum, wherein in the resin thin film layer forming step, the monomer layer is formed using a dimethacrylate compound having an alicyclic hydrocarbon skeleton expressed by a following chemical formula (1) as the monomer.

(1)

wherein, symbol A indicates an organic group containing alicyclic hydrocarbon.

[2] In the method of manufacturing a thin-film polymer multi-layer capacitor according to the present invention, it is preferable that, in the resin thin film layer forming step, an electron beam be irradiated onto the monomer layer under a condition where an acceleration voltage per layer thickness of 1 µm of the resin thin film layer falls within a range of from 10 kV/µm to 25 kV/µm and a value (a value relating to a current value condition of an electron beam) which is obtained by dividing "current value (mA) of electron beam" by "drum width (m) of rotary drum×rotational speed (m/s) of rotary drum×layer thickness (µm) of resin thin film layer" falls within a range of from 100 to 2500.

[3] In the method of manufacturing a thin-film polymer multi-layer capacitor according to the present invention, it is preferable that, between the resin thin film layer forming step and the metal thin film layer forming step, the method further include a first plasma treatment step of applying plasma treatment to the resin thin film layer formed by the resin thin film layer forming step under a condition where high frequency power falls within a range of from 50 W to 1000 W.

[4] In the method of manufacturing a thin-film polymer multi-layer capacitor according to the present invention, it is preferable that, between the metal thin film layer forming step and the resin thin film layer forming step, the method further include a second plasma treatment step of applying plasma treatment to the metal thin film layer formed by the metal thin film layer forming step under a condition where high frequency power falls within a range of from 50 W to 1000 W.

[5] In the method of manufacturing a thin-film polymer multi-layer capacitor according to the present invention, it is preferable that, in the metal thin film layer forming step, the metal thin film layer be formed by vapor-depositing a metal material under a condition where a distance between an evaporation source and the rotary drum falls within a range of from 50 mm to 300 mm.

[6] In the method of manufacturing a thin-film polymer multi-layer capacitor according to the present invention, it is preferable that, in the multi-layer body manufacturing step, the resin thin film layer forming step and the metal thin film layer forming step be alternately performed on the rotary drum which is cooled to a predetermined temperature which falls within a range of from 0° C. to 20° C.

[7] In the method of manufacturing a thin-film polymer multi-layer capacitor according to the present invention, it is preferable that the dimethacrylate compound be a tricyclodecane dimethanol dimethacrylate expressed by a following chemical formula (2).

(2)

[8] A thin-film polymer multi-layer capacitor according to the present invention is a thin-film polymer multi-layer capacitor having a multi-layer body formed by alternately laminating: a resin thin film layer formed by forming a monomer layer by a vapor deposition method and, thereafter, by curing the monomer layer by irradiating an electron beam onto the monomer layer; and a metal thin film layer formed by a vapor deposition method, wherein the monomer is a dimethacrylate compound having an alicyclic hydrocarbon skeleton expressed by a following chemical formula (1).

(1)

wherein, symbol A expresses an organic group containing alicyclic hydrocarbon.

[9] In the thin-film polymer multi-layer capacitor according to the present invention, it is preferable that the dimethacrylate compound be a tricyclodecane dimethanol dimethacrylate expressed by a following chemical formula (2).

(2)

Advantageous Effects of Invention

According to the method of manufacturing a thin-film polymer multi-layer capacitor according to the present invention, with the use of a dimethacrylate compound having an alicyclic hydrocarbon skeleton expressed by the previously-mentioned chemical formula (1) as a monomer in place of a methacrylate compound used in general, as can be clearly understood from a test example 1 described later, a degree of curing of the obtained resin thin film layer can be sufficiently increased. As a result, it is possible to manufacture a thin-film polymer multi-layer capacitor having desired performance. Accordingly, the thin-film polymer multi-layer capacitor of the present invention becomes the thin-film polymer multi-layer capacitor having desired performances.

The reason that the method according to the present invention uses the compound having an alicyclic hydrocarbon skeleton expressed by the previously mentioned chemical formula (1) is as follows. That is, when the compound having an alicyclic hydrocarbon skeleton expressed by the previously mentioned chemical formula (1) is used, reactivity of a monomer is high compared to the case where a compound having a chain hydrocarbon skeleton is used and hence, a degree of curing of the obtained resin thin film layer can be increased. Particularly, when the alicyclic hydrocarbon skeleton is tricyclodecane, this effect of increasing a degree of curing of the obtained resin thin film layer is further enhanced. Further, when a dimethacrylate compound having two functional group in a molecule is used, reactivity of a monomer is high compared to the case where a methacrylate compound having only one functional group in a molecule is used and hence, it is possible to increase a degree of curing of the obtained resin thin film layer. Unlike a dimethacrylate compound having two functional groups in a molecule, a methacrylate compound having three or more functional groups in a molecule has excessively high viscosity although reactivity of a monomer is high and hence, it is difficult to use such a methacrylate compound having three or more functional groups in the manufacture of a thin-film polymer multi-layer capacitor.

According to the method of manufacturing a thin-film polymer multi-layer capacitor of the present invention, with the use of a dimethacrylate compound having an alicyclic hydrocarbon skeleton expressed by the previously-mentioned chemical formula (1) as a monomer in place of an acrylate compound used in general, as can be clearly understood from a test example 2 described later, it is possible to manufacture a thin-film polymer multi-layer capacitor which has a long lifetime in a high temperature and high humidity environment. Accordingly, the thin-film polymer multi-layer capacitor of the present invention becomes the thin-film polymer multi-layer capacitor which has a long lifetime in a high temperature and high humidity environment. To be more specific, the thin-film polymer multi-layer capacitor of the present invention can acquire the lifetime performance warranty of "60° C.-95% RH" or "85° C.-85% RH".

According to the method of manufacturing a thin-film polymer multi-layer capacitor according to the present invention, with the use of a dimethacrylate compound having an alicyclic hydrocarbon skeleton expressed by the previously-mentioned chemical formula (1) as a monomer in place of an acrylate compound used in general, as can be clearly understood from a test example 3 described later, it is possible to manufacture a thin-film polymer multi-layer capacitor which exhibits a low moisture absorption amount, that is, a thin-film polymer multi-layer capacitor which exhibits high floor life performance (moisture absorption reflow performance). Accordingly, the thin-film polymer multi-layer capacitor of the present invention becomes a thin-film polymer multi-layer capacitor which exhibits high floor life performance (moisture absorption reflow performance).

According to the method of manufacturing a thin-film polymer multi-layer capacitor according to the present invention, with the use of a dimethacrylate compound having an alicyclic hydrocarbon skeleton expressed by the previously-mentioned chemical formula (1) as a monomer in place of an acrylate compound used in general, as can be clearly understood from a test example 4 described later, it is possible to manufacture a thin-film polymer multi-layer capacitor which exhibits a small dielectric dissipation factor (tan δ). Accordingly, the thin-film polymer multi-layer capacitor of the present invention becomes a thin-film polymer multi-layer capacitor having a small dielectric dissipation factor (tan δ).

DESCRIPTION OF EMBODIMENTS

Hereinafter, the method of manufacturing a thin-film polymer multi-layer capacitor according to the present invention is described in accordance with an embodiment described in the drawings.

Embodiment

1. Method of Manufacturing a Thin-Film Polymer Multi-Layer Capacitor

Figure 1:
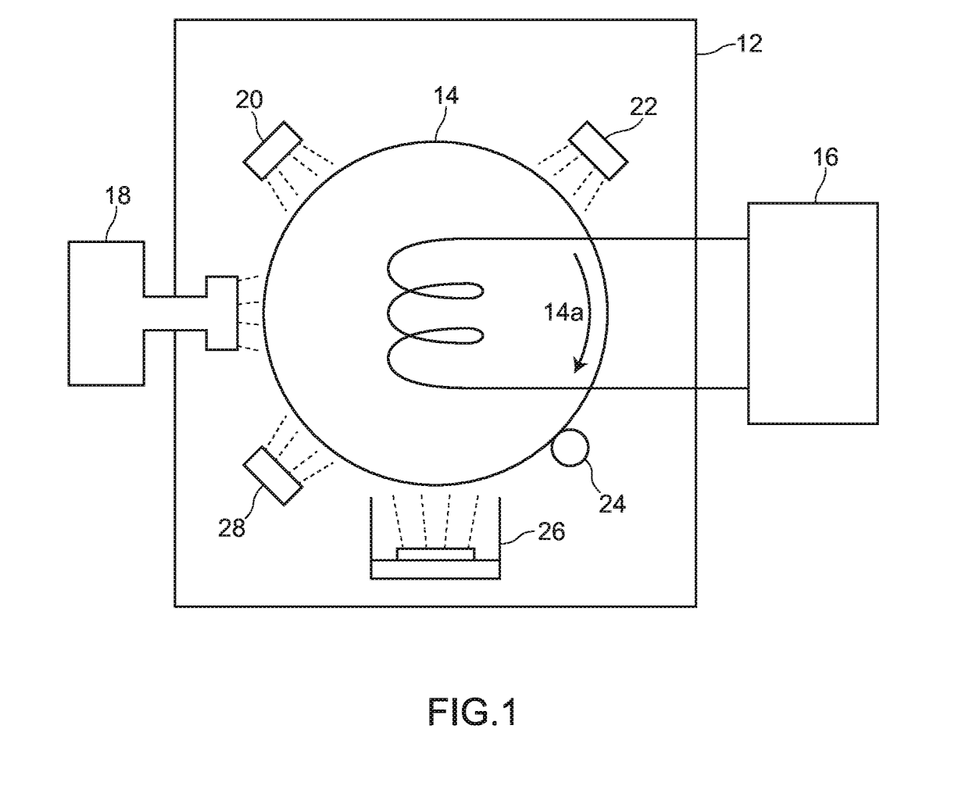
FIG. 1 is a view showing a manufacturing apparatus 10 for carrying out a method of manufacturing a thin-film polymer multi-layer capacitor according to an embodiment.

FIG. 1 is a view showing a manufacturing apparatus 10 for carrying out the method of manufacturing a thin-film polymer multi-layer capacitor according to the embodiment.

The manufacturing apparatus 10 includes: a vacuum chamber 12; a rotary drum 14 which rotates in the inside of the vacuum chamber 12; a monomer vapor deposition device 18; an electron beam irradiation device 20; a first plasma treatment device 22; a metal thin film layer patterning device 24; a metal vapor-deposition device 26; and a second plasma treatment device 28. The monomer vapor deposition device 18, the electron beam irradiation device 20, the first plasma treatment device 22, the metal thin film layer patterning device 24, the metal vapor-deposition device 26, and the second plasma treatment device 28 are arranged around the rotary drum 14 along a rotational direction 14a of the rotary drum 14. A vacuum discharge device and a purge device not shown in the drawing are connected to the vacuum chamber 12.

The rotary drum 14 is rotatably driven in the rotational direction 14a by a rotary drive device not shown in the drawing. Although a rotational speed of the rotary drum 14 can be freely set, the rotational speed is usually set to a value which falls within a range of from approximately 15 rpm to 70 rpm. An outer peripheral surface (substrate surface) of the rotary drum 14 is smoothly finished. It is preferable that a mirror finish be applied to the outer peripheral surface of the rotary drum 14. The outer peripheral surface of the rotary drum 14 is cooled by a cooling mechanism 16 at a predetermined temperature which preferably falls within a range of from 0° C. to 20° C., and more preferably falls within a range of from 5° C. to 15° C.

The monomer vapor deposition device 18 evaporates or vaporizes a monomer for forming a resin thin film layer by heating a monomer, and deposits the monomer on the rotary drum 14 by vapor deposition.

The electron beam irradiation device 20 forms a monomer layer into a resin thin film layer through polymerization or cross-linking of a monomer resin.

The first plasma treatment device 22 is an oxygen plasma device for enhancing adhesiveness between the resin thin film layer and the metal thin film layer by activating a surface of the resin thin film layer by oxygen plasma treatment. In the method of manufacturing a thin-film polymer multi-layer capacitor according to the embodiment, the first plasma treatment device 22 also performs a function of sufficiently increasing a degree of curing of the resin thin film layer by accelerating a polymerization reaction of the resin thin film layer with heat generated by plasma. The first plasma treatment device 22 is not limited to an oxygen plasma treatment device, and may be other plasma treatment devices such as a nitrogen plasma treatment device or an argon plasma treatment device.

The metal thin film layer patterning device 24 evaporates or vaporizes a patterning material such as oil, for example, and injects an evaporated or vaporized patterning material from a nozzle, and deposits the evaporated or vaporized patterning material on a surface of the resin thin film layer in a strip shape.

The metal vapor-deposition device 26 forms a metal thin film layer on a surface of the rotary drum 14 by vapor-depositing a metal material using an electron beam heating vapor-depositing method. To be more specific, an electron beam is irradiated to a metal material accommodated in a crucible (metal vapor deposition source) from an electron gun so that the metal material in the crucible is evaporated or vaporized due to energy of the electron beam, and the evaporated or vaporized metal material is deposited on the rotary drum 14. The metal vapor-deposition device 26 is not limited to a device which uses an electron beam heating and vapor-deposition method, and may be a device which uses other vacuum vapor-deposition method such as a resistance heating vapor-deposition method, a sputtering method or the like.

The second plasma treatment device 28 is an oxygen plasma treatment device which enhances adhesiveness between the metal thin film layer and the resin thin film layer by removing a patterning material deposited on the resin thin film layer by the metal thin film layer patterning device 24 and, thereafter, by activating the surface of the metal thin film layer by oxygen plasma treatment. In the method of manufacturing a thin-film polymer multi-layer capacitor according to the embodiment, the second plasma treatment device 28 also performs a function of sufficiently increasing a degree of curing of the resin thin film layer by accelerating a polymerization reaction of the resin thin film layer with heat generated by plasma. The second plasma treatment device 28 is not limited to an oxygen plasma treatment device, and may be other plasma treatment devices such as a nitrogen plasma treatment device or an argon plasma treatment device.

The control device controls operations of the monomer vapor deposition device 18, the electron beam irradiation device 20, the first plasma treatment device 22, the metal thin film layer patterning device 24, the metal vapor-deposition device 26, the second plasma treatment device 28, and the vacuum discharge device and the purge device not shown in the drawing.

2. Method of Manufacturing a Thin-Film Polymer Multi-Layer Capacitor According to Embodiment The method of manufacturing a thin-film polymer multi-layer capacitor according to the embodiment is described.

First, a monomer layer is formed on an outer periphery of a rotary drum 14 by the monomer vapor deposition device 18, and the monomer layer is cured by the electron beam irradiation device 20 thus forming a resin thin film layer (resin thin film layer forming step). Next, a surface of the resin thin film layer is activated by oxygen plasma treatment using the first plasma treatment device 22 (first plasma treatment step). Next, a patterning material is deposited in a strip shape on the resin thin film layer using the metal thin film layer patterning device 24. Next, a metal thin film layer is formed on the resin thin film layer using the metal vapor-deposition device 26 (metal thin film layer forming step). At this stage of operation, a metal thin film layer is not formed on portions where the patterning material is deposited, and these portions form electrically insulating portions of a multi-layer body. A layer thickness of the resin thin film layer is set to a value which falls within a range of from 100 nm to 1500 nm, for example, and a layer thickness of the metal thin film layer is set to a value which falls within a range of from 10 nm to 40 nm, for example.

Next, a surface of the metal thin film layer is activated by oxygen plasma treatment using the second plasma treatment device 28 (second plasma treatment step). With such an operation, the patterning material deposited using the metal thin film layer patterning device 24 can be removed. Further, in forming a monomer layer again using the monomer vapor deposition device 18, metal which forms the metal thin film layer and carbon contained in a monomer which forms the resin thin film layer are chemically bonded to each other and, as a result, adhesiveness between the metal thin film layer and the resin thin film layer is enhanced.

In the resin thin film layer forming step, a monomer layer is formed using a dimethacrylate compound having an alicyclic hydrocarbon skeleton expressed by the chemical formula (1) as a monomer. To be more specific, the dimethacrylate compound having an alicyclic hydrocarbon skeleton expressed by the above-mentioned chemical formula (1) is evaporated or vaporized by heating, and the evaporated or vaporized dimethacrylate compound is deposited on the cooled rotary drum 14 thus forming a monomer layer.

In the resin thin film layer forming step, an electron beam is irradiated to the monomer layer under a condition where an acceleration voltage per layer thickness of 1 μm of the resin thin film layer falls within a range of from 10 kV/μm to 25 kV/μm and a value (a value relating to a current value condition of an electron beam) which is obtained by dividing "current value (mA) of electron beam" by "drum width (m) of rotary drum×rotational speed (m/s) of rotary drum×layer thickness (μm) of resin thin film layer" falls within a range of from 100 to 2500.

The reason an acceleration voltage per layer thickness of 1 μm of the resin thin film layer is set to a value which falls within a range of from 10 kV/μm to 25 kV/μm is as follows. That is, when the acceleration voltage per layer thickness of 1 μm of the resin thin film layer is set lower than 10 kV/μm, there may be a case where it becomes difficult to sufficiently increase a degree of curing of the obtained resin thin film layer by realizing a sufficient progress of a polymerization reaction (cross-linking reaction) of a monomer. On the other hand, when the acceleration voltage per layer thickness of 1 μm of the resin thin film layer is set higher than 25 kV/μm, a portion of the multi-layer body forming a lower layer is damaged thus giving rise to a possibility of the occurrence of a drawback that performance of a capacitor is degraded. In the case of an acrylate compound which is used in the manufacture of a thin-film polymer multi-layer capacitor in general, an appropriate condition is that an acceleration voltage per layer thickness of 1 μm of the resin thin film layer is set to a value which falls within a range of from 5 kV/μm to 15 kV/μm. Accordingly, the acceleration voltage condition of the present invention is approximately 1.5 times to 3 times as large as the acceleration voltage condition used in the manufacture of the thin-film polymer multi-layer capacitor in general.

The reason a value which is obtained by dividing "current value (mA) of electron beam" by "drum width (m) of rotary drum×rotational speed (m/s) of rotary drum×layer thickness (μm) of resin thin film layer" is set to a value which falls within a range of from 100 to 2500 is as follows. That is, when the value is set less than 100, there may be a case where it becomes difficult to sufficiently increase a degree of curing of the obtained resin thin film layer by sufficiently progressing a polymerization reaction (cross-linking reaction) of a monomer. On the other hand, when the value is set more than 2500, a degree of curing of the obtained resin thin film layer becomes excessively high and hence, a multi-layer body per se becomes hard and brittle whereby a drawback that the multi-layer body cracks when the multi-layer body is peeled off from the rotary drum or is flattened in succeeding steps is liable to occur. From this point of view, in the resin thin film layer forming step, it is more preferable to irradiate an electron beam to the monomer layer under a condition where the above-mentioned value relating to a current value condition of the electron beam falls within a range of from 300 to 1000. In the case of an acrylate compound which is used in the thin-film polymer multi-layer capacitor in general, an appropriate condition is that the above-mentioned value relating to a current value condition of an electron beam is set to a value which falls within a range of from approximately 50 to 300. Accordingly, the current condition of an electron beam according to the present invention is approximately 2 times to 8 times as large as the current condition used in the manufacture of the thin-film polymer multi-layer capacitor in general.

In the first plasma treatment step, plasma treatment is applied to the resin thin film layer formed by the resin thin film layer forming step under a condition where high frequency power falls within a range of from 50 W to 1000 W.

The reason that plasma treatment is applied to the resin thin film layer under the condition where high frequency power falls within a range of from 50 W to 1000 W in the first plasma treatment step is as follows. That is, when plasma treatment is applied to the resin thin film layer under the condition where high frequency power is less than 50 W, the resin thin film layer cannot be sufficiently heated in the course of applying plasma treatment to the resin thin film layer and hence, there may be a case where it becomes difficult to sufficiently increase a degree of curing of the obtained resin thin film layer by realizing a sufficient progress of a polymerization reaction (cross-linking reaction) of a monomer. Further, by applying plasma treatment to the resin thin film layer at approximately 1000 W, an effect of heating the resin thin film layer can be sufficiently acquired in the course of applying plasma treatment to the resin thin film layer. Accordingly, it is unnecessary to apply plasma treatment to the resin thin film layer under a condition where high frequency power is higher than 1000 W.

In the metal thin film layer forming step, the metal thin film layer is formed by vapor-depositing a metal material on a surface of the rotary drum 14 by an electron beam heating vapor-deposition method under a condition where a distance between an evaporation source and the rotary drum falls within a range of from 50 mm to 300 mm. To be more specific, an electron beam is irradiated from an electron gun to a metal material accommodated in a crucible (metal vapor deposition source) so that the metal material in the crucible is evaporated or vaporized by energy of the electron beam and the evaporated or vaporized metal material is deposited on the rotary drum 14. As such a metal material, at least one kind of metal material selected from a group consisting of Al, Cu, Zn, Sn, Au, Ag and Pt, for example, can be used.

The reason that the distance between the evaporation source and the rotary drum is set to a value which falls within a range of from 50 mm to 300 mm is as follows. That is, when the distance is set longer than 300 mm, the resin thin film layer cannot be sufficiently heated in the course of vapor-depositing a metal material and hence, there may be a case where it becomes difficult to sufficiently increase a degree of curing of the obtained resin thin film layer by realizing a sufficient progress of a polymerization reaction (cross-linking reaction) of a monomer. On the other hand, when the distance is set shorter than 50 mm, there may be a case where the formation of the metal thin film layer having a uniform thickness becomes difficult.

In the second plasma treatment step, plasma treatment is applied to the metal thin film layer formed by the metal thin film layer forming step under a condition where high frequency power falls within a range of from 50 W to 1000 W.

The reason that plasma treatment is applied to the metal thin film layer under the condition where high frequency power falls within a range of from 50 W to 1000 W in the second plasma treatment step is as follows. That is, when plasma treatment is applied to the metal thin film layer under the condition where high frequency power is less than 50 W, the resin thin film layer cannot be sufficiently heated in the course of applying plasma treatment to the metal thin film layer and hence, there may be a case where it becomes difficult to sufficiently increase a degree of curing of the obtained resin thin film layer by realizing a sufficient progress of a polymerization reaction (cross-linking reaction) of a monomer. Further, by applying plasma treatment to the metal thin film layer at approximately 1000 W, an effect of heating the resin thin film layer can be sufficiently acquired in the course of applying plasma treatment to the metal thin film layer. Accordingly, it is unnecessary to apply plasma treatment to the metal thin film layer under the condition where high frequency power is higher than 1000 W.

In the method of manufacturing a thin-film polymer multi-layer capacitor according to this embodiment, the multi-layer body manufacturing step is performed on the rotary drum 14 which is cooled to a predetermined temperature which falls within a range of from 0° C. to 20° C. Cooling of the rotary drum 14 to the predetermined temperature which falls within a range of from 0° C. to 20° C.

is performed by circulating a cooling medium (antifreezing liquid or water) of a temperature which falls within a range of from −5° C. to 20° C. in a space defined in the inside of the rotary drum 14.

The reason that the multi-layer body manufacturing step is performed on the rotary drum 14 which is cooled to a predetermined temperature which falls within a range of from 0° C. to 20° C. is as follows. That is, when the multi-layer body manufacturing step is performed on the rotary drum cooled to a temperature below 0° C., curing of a monomer is impaired so that there may be a case where the formation of an appropriate resin thin film layer becomes difficult. On the other hand, when the multi-layer body manufacturing step is performed on the rotary drum at a temperature above 20° C., there may be a case where an adhesion efficiency of vaporized monomer to an outer peripheral surface of the rotary drum 14 is lowered.

When a lamination unit formed of a resin thin film layer and a metal thin film layer excluding a strip-like electrically insulating portion is laminated predetermined times on an outer peripheral surface of the rotary drum 14 by repeating the above-mentioned steps, a cylindrical multi-layer body can be obtained. Then, the cylindrical multi-layer body is divided in a radial direction and the divided multi-layer bodies are removed from the rotary drum 14, and the divided multi-layer bodies are taken out from the vacuum chamber 12 through a door not shown in the drawing. Each of the divided multi-layer bodies taken out from the vacuum chamber 12 is curved into an arcuate shape having substantially the same curvature as an outer peripheral surface of the rotary drum 14. Next, the curved multi-layer body is flattened by a press in a heated state. Then, the flattened multi-layer body is divided into stick-like members by cutting. External electrodes are mounted on each stick-like member and each stick-like member is divided into chips by cutting and these chips form thin-film polymer multi-layer capacitors.

That is, the method of manufacturing a thin-film polymer multi-layer capacitor according to this embodiment is a method of manufacturing a multi-layer capacitor which includes: a multi-layer body manufacturing step where, in the vacuum chamber 12, a resin thin film layer forming step of forming a resin thin film layer by forming a monomer layer by vapor-depositing a monomer using a monomer vapor deposition device 18 and thereafter by curing the monomer layer using the electron irradiation device 20 by irradiating an electron beam to the monomer layer; and a metal thin film layer forming step of forming a metal thin film layer by vapor-depositing a metal material using the metal vapor deposition device 26 are alternately performed repeatedly on the rotary drum 14 thus manufacturing a multi-layer body in which a resin thin film layer and a metal thin film layer are alternately laminated on the rotary drum 14.

In the method of manufacturing a thin-film polymer multi-layer capacitor according to this embodiment, in the resin thin film layer forming step, as described previously, the monomer layer is formed using a dimethacrylate compound having an alicyclic hydrocarbon skeleton expressed by the previously-mentioned chemical formula (1) as the monomer.

As such a dimethacrylate compound, a tricyclodecane dimethanol dimethacrylate expressed by the previously-mentioned chemical formula (2) can be preferably used.

3. Advantageous Effects Acquired by Method of Manufacturing a Thin-Film Polymer Multi-Layer Capacitor and Thin-Film Polymer Multi-Layer Capacitor According to this Embodiment According to the method of manufacturing a thin-film polymer multi-layer capacitor of this embodiment described above, with the use of a dimethacrylate compound having an alicyclic hydrocarbon skeleton expressed by the previously-mentioned chemical formula (1) as a monomer in place of a general methacrylate compound, as described previously and as can be clearly understood from a test example 1 described later, a degree of curing of the obtained resin thin film layer can be sufficiently increased. As a result, it is possible to manufacture a thin-film polymer multi-layer capacitor having desired performance. Accordingly, the thin-film polymer multi-layer capacitor of the embodiment becomes the thin-film polymer multi-layer capacitor having desired performances.

According to the method of manufacturing a thin-film polymer multi-layer capacitor of this embodiment, with the use of a dimethacrylate compound having an alicyclic hydrocarbon skeleton expressed by the previously-mentioned chemical formula (1) as a monomer in place of an acrylate compound used in general, as can be clearly understood from a test example 2 described later, it is possible to manufacture a thin-film polymer multi-layer capacitor which has a long lifetime in a high temperature and high humidity environment. Accordingly, the thin-film polymer multi-layer capacitor of the embodiment becomes the thin-film polymer multi-layer capacitor which has a long lifetime in a high temperature and high humidity environment. To be more specific, the thin-film polymer multi-layer capacitor of the embodiment can acquire the lifetime performance warranty of "60° C.·95% RH" or "85° C.·85% RH".

According to the method of manufacturing a thin-film polymer multi-layer capacitor according to this embodiment, with the use of a dimethacrylate compound having an alicyclic hydrocarbon skeleton expressed by the previously-mentioned chemical formula (1) as a monomer in place of an acrylate compound used in general, as can be clearly understood from a test example 3 described later, it is possible to manufacture a thin-film polymer multi-layer capacitor which exhibits a low moisture absorption amount, that is, a thin-film polymer multi-layer capacitor which exhibits high floor life performance (moisture absorption reflow performance). Accordingly, the thin-film polymer multi-layer capacitor of the embodiment becomes a thin-film polymer multi-layer capacitor which exhibits high floor life performance (moisture absorption reflow performance).

According to the method of manufacturing a thin-film polymer multi-layer capacitor according to this embodiment, with the use of a dimethacrylate compound having an alicyclic hydrocarbon skeleton expressed by the previously-mentioned chemical formula (1) as a monomer in place of an acrylate compound used in general, as can be clearly understood from a test example 4 described later, it is possible to manufacture a thin-film polymer multi-layer capacitor which exhibits a small dielectric dissipation factor (tan δ). Accordingly, the thin-film polymer multi-layer capacitor of the embodiment becomes a thin-film polymer multi-layer capacitor having a small dielectric dissipation factor (tan δ).

According to the method of manufacturing a thin-film polymer multi-layer capacitor according to this embodiment, in the resin thin film layer forming step, an electron beam is irradiated to the monomer layer under a condition where an acceleration voltage per layer thickness of 1 μm of the resin thin film layer falls within a range of from 10 kV/μm to 25 kV/μm and a value which is obtained by dividing "current value (mA) of electron beam" by "drum width (m) of rotary drum×rotational speed (m/s) of rotary drum×layer thickness (μm) of resin thin film layer" falls within a range of from 100 to 2500. Accordingly, the polymerization reaction (cross-linking reaction) of a monomer progresses in the course of irradiating an electron beam to the monomer layer and hence, it is possible to obtain the resin thin film layer having an appropriate degree of curing.

According to the method of manufacturing a thin-film polymer multi-layer capacitor according to this embodiment, between the resin thin film layer forming step and the metal thin film layer forming step, the method further includes a first plasma treatment step of applying plasma treatment to the resin thin film layer formed by the resin thin film layer forming step under a condition where high frequency power falls within a range of from 50 W to 1000 W. Accordingly, a resin thin film layer is sufficiently heated in the course of applying plasma treatment to the resin thin film layer in the first plasma treatment step and hence, a polymerization reaction (cross-linking reaction) of a monomer progresses so that a degree of curing of the obtained resin thin film layer can be further increased.

In this case, since the plasma treatment (first plasma treatment) is performed immediately after the formation of the resin thin film layer by irradiating an electron beam to the monomer layer, an effect of accelerating a degree of curing of a resin can be increased.

According to the method of manufacturing a thin-film polymer multi-layer capacitor according to this embodiment, in the metal thin film layer forming step, the metal thin film layer is formed by vapor-depositing a metal material under a condition where a distance between the evaporation source and the rotary drum falls within a range of from 50 mm to 300 mm. Accordingly, the resin thin film layer is sufficiently heated in the course of vapor-depositing a metal material in the metal thin film layer forming step and hence, a polymerization reaction (cross-linking reaction) of a monomer progresses so that a degree of curing of the obtained resin thin film layer can be further increased.

According to the method of manufacturing a thin-film polymer multi-layer capacitor according to this embodiment, between the metal thin film layer forming step and the resin thin film layer forming step, the method further includes a second plasma treatment step of applying plasma treatment to the metal thin film layer formed by the metal thin film layer forming step under a condition where high frequency power falls within a range of from 50 W to 1000 W. Accordingly, the resin thin film layer is sufficiently heated in the course of applying plasma treatment to the resin thin film layer in the second plasma treatment step and hence, a polymerization reaction (cross-linking reaction) of a monomer progresses so that a degree of curing of the obtained resin thin film layer can be further enhanced.

According to the method of manufacturing a thin-film polymer multi-layer capacitor according to this embodiment, in the multi-layer body manufacturing step, the resin thin film layer forming step and the metal thin film layer forming step are alternately performed on the rotary drum which is cooled to a predetermined temperature which falls within a range of from 0° C. to 20° C. Accordingly, an adhesion rate of a monomer can be increased.

When the resin thin film layer forming step is performed on the rotary drum cooled to a predetermined temperature which falls within a range of from 0° C. to 20° C., a monomer layer is cooled and hence, it may be considered that the progress of polymerization reaction (cross-linking reaction) of the monomer becomes slow. However, as can be clearly understood from the test example 1 described later, in the resin thin film layer forming step, an electron beam is irradiated to the monomer layer under a condition where an acceleration voltage per layer thickness of 1 μm of the resin thin film layer falls within a range of from 10 kV/μm to 25 kV/μm and a value which is obtained by dividing "current value (mA) of electron beam" by "drum width (m) of rotary drum×rotational speed (m/s) of rotary drum×layer thickness (μm) of resin thin film layer" falls within a range of from 100 to 2500. In the first plasma treatment step, plasma treatment is applied to the resin thin film layer under a condition where high frequency power falls within a range of from 50 W to 1000 W. In the metal thin film layer forming step, the metal thin film layer is formed by vapor-depositing a metal material under a condition where a distance between the evaporation source and the rotary drum falls within a range of from 50 mm to 300 mm. In the second plasma treatment step, plasma treatment is applied to the metal thin film layer under a condition where high frequency power falls within a range of from 50 W to 1000 W. With such steps, it is sufficiently possible to obtain a resin thin film layer having an appropriate degree of curing and hence, it is possible to manufacture a thin-film polymer multi-layer capacitor having desired performance.

Further, according to the method of manufacturing a thin-film polymer multi-layer capacitor of this embodiment, the dimethacrylate compound is a tricyclodecane dimethanol dimethacrylate expressed by the previously-mentioned chemical formula (2). Accordingly, it is possible to maintain properties of a monomer at the time of manufacture at a high standard in a well-balanced manner, wherein properties of the monomer include evaporation property, adhesion efficiency to a rotary drum, curing property, and lifetime performance, moisture absorption amount, and a dielectric dissipation factor (tan δ) in a high temperature and high humidity environment as capacitor performances.

Test Example

The test example 1 is a test example which proves that "a thin-film polymer multi-layer capacitor manufactured by the method of manufacturing a thin-film polymer multi-layer capacitor according to the present invention is a thin-film polymer multi-layer capacitor which exhibits high degree of curing of a resin thin film layer and possesses desired performance". The test example 2 is a test example which proves that "a thin-film polymer multi-layer capacitor manufactured by the method of manufacturing a thin-film polymer multi-layer capacitor according to the present invention exhibits a long lifetime in a high temperature and high humidity environment". The test example 3 is a test example which proves that "A thin-film polymer multi-layer capacitor manufactured by the method of manufacturing a thin-film polymer multi-layer capacitor according to the present invention exhibits a small moisture absorption amount". The test example 4 is a test example which proves that "A thin-film polymer multi-layer capacitor manufactured by the method of manufacturing a thin-film polymer multi-layer capacitor according to the present invention exhibits a small dielectric dissipation factor (tan δ)".

1. Preparation of Specimen

[1] Specimen 1 (Example)

Basically, a multi-layer body was prepared by a method substantially equal to the method of manufacturing a thin-film polymer multi-layer capacitor according to the embodiment, and a thin-film polymer multi-layer capacitor (layer thickness of resin thin film layer: 0.5 µm, capacitance: 1 µF, chip size: 4532) was prepared using the multi-layer body, and the thin-film polymer multi-layer capacitor was used as a specimen 1. As a monomer, tricyclodecane dimethanol dimethacrylate expressed by the previously-mentioned chemical formula (2) was used. As a condition for electron beam irradiation, a condition was adopted where an acceleration voltage per layer thickness of 1 µm of the resin thin film layer is 14 kV/µm and a value (a value relating to a current value condition of an electron beam) which is obtained by dividing "current value (mA) of electron beam" by "drum width (m) of rotary drum×rotational speed (m/s) of rotary drum×layer thickness (µm) of resin thin film layer" becomes 667.

[2] Specimen 2 (Comparison Example)

A multi-layer body was prepared by a method substantially equal to the method of manufacturing used for manufacturing the specimen 1 except for adopting, as a condition for electron beam irradiation, a condition where an acceleration voltage per layer thickness of 1 µm of the resin thin film layer is 8 kV/µm and a value (a value relating to a current value condition of an electron beam) which is obtained by dividing "current value (mA) of electron beam" by "drum width (m) of rotary drum×rotational speed (m/s) of rotary drum×layer thickness (µm) of resin thin film layer" becomes 117. Then, a thin-film polymer multi-layer capacitor was prepared using the multi-layer body, and the thin-film polymer multi-layer capacitor was used as a specimen 2.

[3] Specimen 3 (Comparison Example)

A multi-layer body was prepared by a method substantially equal to the method of manufacturing used for manufacturing the specimen 1 except for adopting a condition where tricyclodecane dimethanol diacrylate is used as a monomer, and an acceleration voltage per layer thickness of 1 µm of the resin thin film layer is 8 kV/µm and a value (a value relating to a current value condition of an electron beam) which is obtained by dividing "current value (mA) of electron beam" by "drum width (m) of rotary drum×rotational speed (m/s) of rotary drum×layer thickness (µm) of resin thin film layer" becomes 117. Then, a thin-film polymer multi-layer capacitor was prepared using the multi-layer body, and the thin-film polymer multi-layer capacitor was used as a specimen 3.

2. Evaluation Method

[1] Test Example 1 (Degree of Curing)

A degree of curing of the resin thin film layer was measured immediately after the multi-layer body was manufactured. The measurement was performed using an infrared spectrophotometer such that absorbance of a C=O group and absorbance of a C=C group in the resin thin film layer of the multi-layer body and a raw material monomer were measured, and a degree of curing of the resin thin film layer was calculated using a first rate between the absorbance of the C=O group and the absorbance of the C=C group in the resin thin film layer and a second rate between the absorbance of the C=O group and the absorbance of C=C group in the raw material monomer.

[2] Test Example 2 (Lifetime in a High Temperature and High Humidity Environment)

A DC voltage of 50V was applied to the respective specimens and such a state was maintained for 500 hours in a high temperature and high humidity environment (85° C.·85% RH). Then, the respective specimens were taken out, and capacitances (capacitances in a high temperature and high humidity environment) of the specimens were measured, and degrees of reduction of capacitances were measured using capacitances measured before the specimens were placed under the environment of high temperature and high humidity as references (capacitance change rates in a high temperature and high humidity environment). In the test example 2, it is possible to determine that the smaller a capacitance reduction amount, the longer a lifetime in a high temperature and high humidity environment becomes. In the specimen 2, a degree of curing was excessively low so that interlayer peeling occurred in the multi-layer body per se whereby a thin-film polymer multi-layer capacitor could not be prepared. Accordingly, the test relating to the test example 2 was carried out only with respect to the specimen 1 and the specimen 3.

[3] Test Example 3 (Moisture Absorption Amount)

The respective specimens were left for 250 hours under an environment of "30° C.·60% RH". Then, the respective specimens were taken out, and capacitances (capacitances when the respective specimens were placed under the environment of "30° C.·60% RH") were measured, and the degrees of increase of the capacitances were measured using capacitances measured before the specimens were placed under the environment of "30° C.·60% RH" as references (capacitance change rates under the environment of "30° C.·60% RH"). In the test example 3, it is possible to determine that the smaller the capacitance increase amount, the lower the moisture absorption amount becomes. As described previously, the degree of curing of the specimen 2 was excessively low so that a thin-film polymer multi-layer capacitor could not be prepared. Accordingly, the test relating to the test example 3 was carried out only with respect to the specimen 1 and the specimen 3.

[4] Test Example 4 (Dielectric Dissipation Factor (Tan δ))

A dielectric dissipation factor (tan δ) at 1 kHz was measured using an LCR meter with respect to the respective specimens. As described previously, the degree of curing of the specimen 2 was excessively low so that a thin-film polymer multi-layer capacitor could not be prepared. Accordingly, the test relating to the test example 4 was carried out only with respect to the specimen 1 and the specimen 3.

3. Evaluation Result

Table 1 is a view showing the result of the test examples 1 to 4.

TABLE 1

| respective test examples | test example 1 Degree of curing | test example 2 capacitance change rate when test example 2 was placed in a high temperature and high humidity environment | test example 3 capacitance change rate when test example 3 was placed under environment of "30° C. · 60% RH" | test example 4 dielectric dissipation factor (tanδ) | compre- hensive evaluation |
|---|---|---|---|---|---|
| specimen 1 (example) | 52% | −10% | +5% | 0.55% | good |
| specimen 2 (comparison example) | 38% | *1 | *1 | *1 | bad |
| specimen 3 (comparison example) | 54% | −80% | +7% | 0.85% | bad |

*1: Measurement was not made since a degree of curing was excessively low so that a thin-film polymer multi-layer capacitor could not be manufacture.

As can be understood also from Table 1, it was found out that, in the specimen (specimen 1) which was prepared using tricyclodecane dimethanol dimethacrylate as a monomer, in the same manner as the specimen (specimen 3) which was prepared using tricyclodecane dimethanol diacrylate as a monomer, a resin thin film layer was formed with an appropriate degree of curing and hence, a thin-film polymer multi-layer capacitor exhibiting desired performance can be manufactured (see test example 1). It is also found out that the specimen (specimen 1) which was prepared using tricyclodecane dimethanol dimethacrylate as a monomer exhibits a long lifetime in a high temperature and high humidity environment (see test example 2), low hydroscopic property (see test example 3) and a small dielectric dissipation factor (tan δ) (see test example 4)) compared to the specimen (specimen 3) which was prepared using tricyclodecane dimethanol diacrylate as a monomer, and the specimen (specimen 1) is a comprehensively excellent thin-film polymer multi-layer capacitor.

It is also found out that the specimen (specimen 1) which was prepared by using tricyclodecane dimethanol dimethacrylate as a monomer and by adopting a condition where an acceleration voltage per layer thickness of 1 μm of the resin thin film layer is 14 kV/μm and a value which is obtained by dividing "current value (mA) of electron beam" by "drum width (m) of rotary drum×rotational speed (m/s) of rotary drum×layer thickness (μm) of resin thin film layer" becomes 667 as the condition for electron beam irradiation becomes a thin-film polymer multi-layer capacitor exhibiting desired performance unlike the specimen (specimen 2) which was prepared by using tricyclodecane dimethanol dimethacrylate as a monomer and by adopting the condition where an acceleration voltage per layer thickness of 1 μm of the resin thin film layer is 8 kV/μm and a value which is obtained by dividing "current value (mA) of electron beam" by "drum width (m) of rotary drum×rotational speed (m/s) of rotary drum×layer thickness (μm) of resin thin film layer" becomes 117 as the condition for electron beam irradiation (see test example 1).

The method of manufacturing a thin-film polymer multi-layer capacitor according to the present invention and the thin-film polymer multi-layer capacitor according to the present invention have been described based on the above-mentioned embodiments heretofore. However, the present invention is not limited to these embodiments, and the following modifications are also conceivable, for example, without departing from the gist of the present invention.

[1] In the embodiments, as the manufacturing apparatus for manufacturing a thin-film polymer multi-layer capacitor, the manufacturing apparatus 10 which includes the monomer vapor deposition device 18, the electron beam irradiation device 20, the first plasma treatment device 22, the metal thin film layer patterning device 24, the metal vapor-deposition device 26, the second plasma treatment device 28, the vacuum discharge device, the purge device and the control device is used. However, the present invention is not limited to such a manufacturing apparatus 10. A manufacturing apparatus which is not provided with one or more devices (for example, the second plasma treatment device 28) out of these devices may be also used. Further, it is also possible to use a manufacturing apparatus which further includes another device (for example, a device which deposits a coupling material (Ti) for enhancing adhesiveness between the resin thin film layer and the metal thin film layer onto a surface of the metal thin film layer) in addition to these devices.

REFERENCE SIGNS LIST

1: thin-film polymer multi-layer capacitor
2: multi-layer body
3, 4: external electrode
10: manufacturing apparatus
12: vacuum chamber
14: rotary drum
16: cooling device
18: a monomer vapor deposition device
20: electron beam irradiation device
22: first plasma treatment device
24: metal thin film layer patterning device
26: metal vapor-deposition device
28: second plasma treatment device

The invention claimed is:

1. A method of manufacturing a thin-film polymer multi-layer capacitor comprising a multi-layer body manufacturing step where, in a vacuum chamber, a resin thin film layer forming step of forming a resin thin film layer by forming a monomer layer by vapor-depositing a monomer and thereafter by curing the monomer layer by irradiating an electron beam onto the monomer layer, and a metal thin film layer forming step of forming a metal thin film layer by vapor-depositing a metal material are alternately performed on a rotary drum thus forming a multi-layer body in which the resin thin film layer and the metal thin film layer are alternately laminated on the rotary drum, wherein in the resin thin film layer forming step, the monomer layer is formed using a dimethacrylate compound having an alicyclic hydrocarbon skeleton expressed by a following chemical formula (1) as the monomer wherein, symbol A indicates an organic group containing alicyclic hydrocarbon.

2. The method of manufacturing a thin-film polymer multi-layer capacitor according to claim 1, wherein, in the resin thin film layer forming step, an electron beam is irradiated onto the monomer layer under a condition where an acceleration voltage per layer thickness of 1 μm of the resin thin film layer falls within a range of from 10 kV/μm to 25 kV/μm and a value which is obtained by dividing "current value (mA) of electron beam" by "drum width (m) of rotary drum×rotational speed (m/s) of rotary drum×layer thickness (μm) of resin thin film layer" falls within a range of from 100 to 2500.

3. The method of manufacturing a thin-film polymer multi-layer capacitor according to claim 1, wherein, between the resin thin film layer forming step and the metal thin film layer forming step, the method further includes a first plasma treatment step of applying plasma treatment to the resin thin film layer formed by the resin thin film layer forming step under a condition where high frequency power falls within a range of from 50 W to 1000 W.

4. The method of manufacturing a thin-film polymer multi-layer capacitor according to claim 1, wherein, between the metal thin film layer forming step and the resin thin film layer forming step, the method further includes a second plasma treatment step of applying plasma treatment to the metal thin film layer formed by the metal thin film layer forming step under a condition where high frequency power falls within a range of from 50 W to 1000 W.

5. The method of manufacturing a thin-film polymer multi-layer capacitor according to claim 1, wherein, in the metal thin film layer forming step, the metal thin film layer is formed by vapor-depositing a metal material under a condition where a distance between an evaporation source and the rotary drum falls within a range of from 50 mm to 300 mm.

6. The method of manufacturing a thin-film polymer multi-layer capacitor according to claim 1, wherein, in the multi-layer body manufacturing step, the resin thin film layer forming step and the metal thin film layer forming step are alternately performed on the rotary drum which is cooled to a predetermined temperature which falls within a range of from 0° C. to 20° C.

7. The method of manufacturing a thin-film polymer multi-layer capacitor according to claim 1, wherein the dimethacrylate compound is a tricyclodecane dimethanol dimethacrylate expressed by a following chemical formula (2)

8. A thin-film polymer multi-layer capacitor having a multi-layer body formed by alternately laminating: a resin thin film layer formed by forming a monomer layer by a vapor deposition method and, thereafter, by curing the monomer layer by irradiating an electron beam onto the monomer layer; and a metal thin film layer formed by a vapor deposition method, wherein the monomer is a dimethacrylate compound having an alicyclic hydrocarbon skeleton expressed by a following chemical formula (1)

wherein, symbol A indicates an organic group containing alicyclic hydrocarbon.

9. The thin-film polymer multi-layer capacitor according to claim 8, wherein the dimethacrylate compound is a tricyclodecane dimethanol dimethacrylate expressed by a following chemical formula (2)

* * * * *